United States Patent [19]
Gove et al.

[11] Patent Number: 5,530,482
[45] Date of Patent: Jun. 25, 1996

[54] PIXEL DATA PROCESSING FOR SPATIAL LIGHT MODULATOR HAVING STAGGERED PIXELS

[75] Inventors: Robert J. Gove, Los Gatos, Calif.; Vishal Markandey, Dallas, Tex.

[73] Assignee: Texas Instruments Incorporated, Dallas, Tex.

[21] Appl. No.: 407,938

[22] Filed: Mar. 21, 1995

[51] Int. Cl.$^6$ .................... H04N 5/74; H04N 7/01
[52] U.S. Cl. .................... 348/441; 348/448; 348/771
[58] Field of Search .................... 348/770, 771, 348/441, 448, 581; 345/127, 204, 214; H04N 5/74, 7/01

[56] References Cited

U.S. PATENT DOCUMENTS 4,879,602  11/1989  Glenn .................... 348/271
4,916,541  4/1990  Hashimoto et al. .................... 348/448
5,422,658  6/1995  Kawaguchi .................... 348/448
5,442,411  8/1995  Urbanus .................... 348/771

*Primary Examiner*—Victor R. Kostak
*Attorney, Agent, or Firm*—Julie L. Reed; James C. Kesterson; Richard L. Donaldson

[57] ABSTRACT

Methods of processing pixel data for display on a spatial light modulator (SLM) (15) having staggered pixels. An analog image signal in interlaced field format is sampled to provide staggered pixel data in field format, where pixel values in odd lines are offset from pixel values in even lines. This staggered pixel data may be converted to progressive scan frame format using special calculations to accommodate the line-to-line offset of the pixels (FIGS. 2–6). Vertical scaling may also be performed, either before or after the data is converted to frame format (FIGS. 7 and 8).

10 Claims, 3 Drawing Sheets

PIXEL DATA PROCESSING FOR SPATIAL LIGHT MODULATOR HAVING STAGGERED PIXELS

TECHNICAL FIELD OF THE INVENTION

This invention relates to spatial light modulators, and more particularly to processing pixel data for display with a spatial light modulator whose pixels have a staggered pattern.

BACKGROUND OF THE INVENTION

Image display systems based on spatial light modulators (SLMs) are increasingly being used as an alternative to image display systems based on cathode ray tubes. As used for image display applications, SLMs are arrays of pixel-generating elements that emit or reflect light to an image plane. The pixel-generating elements of the SLM are often themselves referred to as "pixels", as distinguished from pixels of the image. This terminology is clear from context, so long as it is understood that more than one pixel of the SLM can be used to generate a pixel of the image.

The pixels of the SLM are individually addressable, such that the image is defined by which pixels are on or off at a given time. The addressing of each pixel is in response to pixel data representing the on or off state of each pixel. Moving images can be generated by readdressing the SLM with data for successive frames. Greyscale images can be created with various modulation schemes, and color images can be created by filtering the emitted or reflected light.

Pixel data to be displayed by an SLM-based display system may be obtained by digitizing an analog input signal or may be delivered to the display system already in digital form. In either case, various pixel data processing tasks may be performed to improve the quality of the image. One such task is progressive scan conversion, where data from interlaced fields is used to generate data for non-interlaced frames. Another such task is vertical scaling, where data having one vertical resolution is used to generate data for a different vertical resolution.

The SLM may have its pixels arranged in either of two basic patterns. One pattern is referred to as the "Manhattan" or "square grid" pattern, in which the pixels are both vertically and horizontally aligned. A second pattern is the "staggered" pattern, in which the pixels of adjacent rows are offset like bricks of a wall.

For SLMs having pixel arrays with the staggered pattern, the perceived horizontal resolution is better than with the square grid pattern. However, the pixel processing tasks for SLMs with staggered pixels present problems not encountered with SLMs with square grid pixels. In general, for tasks involving generation of new lines of pixels, such as progressive scan conversion or scaling, pixel values for each new line are calculated from pixel values on lines above or below the new line. For square grid pixels, pixel values directly above or below the new pixel values are used for the calculations. However, for staggered pixels, the pixel values on the lines above or below the new pixel values are offset and the calculations must be different.

SUMMARY OF THE INVENTION

One aspect of the invention is a method of converting an analog image signal in interlaced field format to pixel data in frame format for display on a spatial light modulator (SLM) having staggered pixels. A first field of the signal is sampled, using a clock signal at a pixel rate that is substantially determined by the product of the number of pixels per field and the field rate. Then, the clock signal is inverted by delaying it one-half its period. The inverted clock signal is used to sample the next field of the signal. This alternation between clock rates for each next field is repeated to sample subsequent fields of the signal, thereby providing staggered pixel values in field format. Then, for each field of the staggered pixel values, new lines of pixel values are provided to be displayed between existing lines of the sampled pixel values. The step of providing new lines of pixel data may be performed by copying existing pixel values from an adjacent field or by calculating new pixel values from neighboring pixel values in the same field.

Other aspects of the invention involve vertically scaling staggered pixel data. The vertical scaling may be performed while the data is in field format (before proscan) or while the data is in frame format.

An advantage of the invention is that the picture quality is optimized for SLMs having staggered pixels. The proscan methods are especially designed for staggered pixels and compensate for the fact that pixels are not vertically aligned from field to field. Several proscan methods do not require extra hardware. Other proscan methods do require extra hardware but provide even better images. Methods of vertical scaling are available to provide similar cost versus image quality tradeoffs.

DETAILED DESCRIPTION OF THE INVENTION

Figure 1:
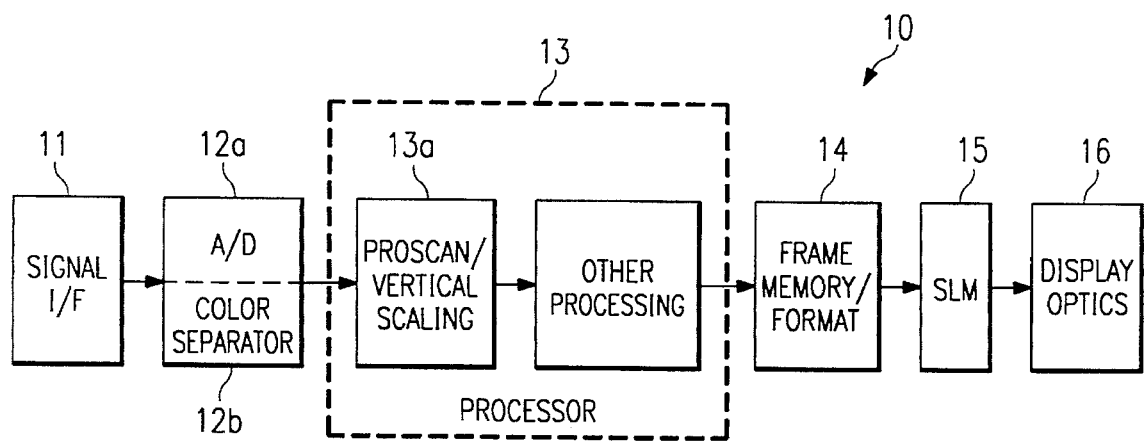
FIG. 1 is a block diagram representing the basic components of an SLM-based image display system, whose SLM has a staggered pixel array.

FIG. 1 is a block diagram representing the basic components of an SLM-based image display system 10. The invention is useful in a display system that receives digital image data or that converts an analog signal to digital image data. For purposes of example, display system 10 is the latter type of system, and receives an analog signal such as a television broadcast signal.

It is assumed that the input signal has interlaced fields, where odd lines of the image to be displayed are in one field and even lines are in the next. On older cathode ray tube (CRT) displays, these fields are scanned separately within one frame period. However, in many digital display systems, such as system 10, after being digitized into pixel values, each field of pixel values is converted to a frame of pixel values. The conversion involves providing a new line between every existing line of the field. After the field format is converted to frame format, the frame rate is twice the frame rate intended for the CRT display. The process of converting fields to frames in this manner is known as "progressive scan conversion" or "proscan", even in SLM-based systems where no scanning is involved. For example, where the incoming signal has a field rate of 60 fields per second, the proscan frame rate is 60 frames per second.

The following description is directed to the use of processor system 13 to process pixel data for display by SLM 15, which has a staggered pixel array. More specifically, processor system 13 is programmed to implement proscan and vertical scaling methods that are specially designed for SLMs having staggered pixels.

In FIG. 1, only those components significant to main-screen processing are shown. Other components, such as might be used for processing synchronization and audio signals, or for features such as closed captioning, are not shown.

As an overview of the operation of system 10, signal interface 11 receives the analog video signal and separates video, synchronization, and audio signals. Signal interface 11 delivers the video signal for the main image to A/D converter 12a and color separator 12b, which convert the signal into pixel data and which separate the luminance data from the chrominance data, respectively. In FIG. 1, the signal is converted to pixel data before color separation, but in other embodiments, color separation could be performed before A/D conversion using analog filters. As explained below in connection with FIGS. 2–8, because SLM 15 has staggered pixels, various embodiments of the invention call for special A/D conversion methods.

Processor system 13 prepares the data for display by performing various pixel processing tasks. Processor system 13 includes various memory devices for storing pixel data during processing, such as field and line buffers.

As explained below in connection with FIGS. 2–8, two tasks performed by processor system 13 are progressive scan conversion and vertical scaling. Other processing tasks that may be performed by processor system 13 are color space conversion, where the luminance and chrominance data are converted to RGB data, and gamma correction, which de-compensates gamma-compensated data to accommodate the linear characteristics of an SLM.

In the preferred embodiment, processor system 13 includes a "scan-line video processor" for performing progressive scan conversion and vertical scaling. This device is commercially available from Texas Instruments Incorporated, and permits line-by-line processing of pixel data. It may be programmed in accordance with the methods described herein.

Frame memory 14 receives processed pixel data from processor system 13. Frame memory 14 formats the data, on input or on output, into "bit-plane" format, and delivers the bit-plane data to SLM 15. The bit-plane format is one in which the pixel data is rearranged by bit-weight. This format permits each pixel of SLM 15 to be turned on or off in response to the value of one bit of data at a time. This capability is used to implement pulse width modulation for generating greyscale images.

In a typical display system 10, frame memory 14 is a "double buffer" memory, which means that it has a capacity for at least two display frames. The buffer for one display frame can be read out to SLM 15 while the buffer for another display frame is being written. The two buffers are controlled in a "ping-pong" manner so that data is continuously available to SLM 15.

SLM 15 may be any type of SLM having a staggered pixel array. For purposes of this description, the staggered array includes any array where the pixels on every other line are substantially aligned in the vertical direction and the pixels on adjacent lines are substantially offset by ½ the pixel width. For purposes of this description, it is assumed that the pixels are square but non-square pixels are possible.

Although this description is in terms of a DMD-type SLM 15, other types of SLMs could be substituted into display system 10 and used with the invention described herein. For example, SLM 15 could be an LCD-type SLM. Details of a suitable SLM 15 are set out in U.S. Pat. No. 4,956 619 entitled "Spatial Light Modulator" which is assigned to Texas Instruments Incorporated and incorporated herein by reference. In the example of this description, SLM 15 has a 640×480 array of mirror elements, each of which is individually addressable. When addressed, the direction in which each mirror tilts, on or off, results in a reflected image.

Display optics unit 16 has optical components for receiving the image from SLM 15 and for illuminating an image plane such as a display screen. For color displays, the data for each color could be sequenced and synchronized to a color wheel that is part of display optics 16. Or, the data for different colors could be concurrently displayed on three SLMs and combined by display optics unit 16. Master timing unit 17 implements various system control functions.

A more comprehensive description of a DMD-based digital display system is set out in U.S. Pat. No. 5,079,5444, entitled "Standard Independent Digitized Video System", and in U.S. Patent Ser. No. 08/147,249, entitled "Digital Television System", and in U.S. Patent Ser. No. 08/146,385, entitled "DMD Display System", each assigned to Texas Instruments Incorporated, and each incorporated by reference herein. U.S. Patent Ser. No. 07/678,761, entitled "DMD Architecture and Timing for Use in a Pulse-Width Modulated Display System", describes a method of formatting video data for use with a DMD-based display system and a method of modulating bit-planes of data to provide varying pixel brightness. The general use of a DMD-based display system with a color wheel to provide sequential color images is described in U.S. Patent Ser. No. 07/809,816, entitled "White Light Enhanced Color Field Sequential Projection". These patents and patent applications are assigned to Texas Instruments Incorporated and are incorporated herein by reference herein.

Progressive Scan Conversion

FIGS. 2–6 illustrate several methods of converting an analog input signal in interlaced field format to pixel data in frame format for a progressive scan display. In each method, the input signal is first sampled to provide field data. Then, for each field, a new line is created between each existing line. In this manner, each field becomes a frame, having twice as many lines to be displayed at double the line rate of the input field.

For simplicity of illustration in FIGS. 2–6, only the conversion of one field (the input field) to a frame is shown. Also, only two lines of each input field and only several pixels of each line are illustrated. The input field contains the input (old) lines and the frame contains the input and output (old and new) lines.

The methods of FIGS. 2–5 call for "field invert" sampling. More specifically, when the input signal is converted to pixel data, the sample clock of A/D converter 12a is inverted every other field. The inversion may be accomplished by delaying the clock signal one-half its clock period. Both fields are sampled at the "pixel rate", which is determined by multiplying the number of pixels per field by the field rate. For example, if the field rate is f fields per second and there are v lines per field, the line rate is v*f lines per second. For h pixels per line, the pixel rate is h*v*f pixels per second. For "oversampled" pixel data, the pixel rate is increased to account for extra pixel values on each line.

After the field invert sampling, every field contains pixel values for either all the odd lines or all the even lines of a frame. These fields alternate every other field between the odd-line fields and the even-line fields. When displayed, the displacement from field to field of the pixel rate clock provides odd-field values and even-field values that correspond to the staggered arrangement of the pixels.

Figure 2:
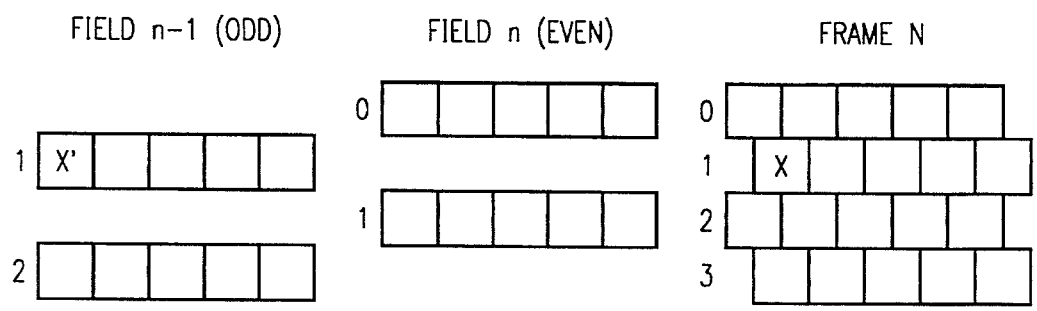
FIG. 2 illustrates a field insert method of progressive scan conversion for staggered pixel data.

The method of FIG. 2 is a "field insert" method of progressive scan conversion. Using appropriate field data buffers, pixel data from an adjacent field is stored and inserted into the field being processed. Typically, the adjacent field is the preceding field, but it may be a future field. Lines from an adjacent odd field are inserted into each even field, and vice versa. Each new pixel value, X, is the same as a pixel value, X', which is spatially aligned but temporally separated. In other words, X' is from the same pixel position but in an adjacent field. The value X' is simply copied to X. The field insert method is suitable for images having little or no motion. Although only the conversion of an even field to a frame is illustrated, odd fields are converted to frames in an analogous manner. Each even field and each odd field becomes a frame by using data from an adjacent field.

Figure 3:
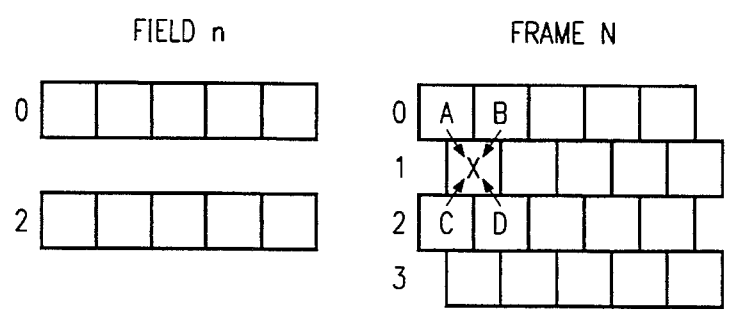
FIG. 3 illustrates a line average method of progressive scan conversion for staggered pixel data.

The method of FIG. 3 is a "line average" method of progressive scan conversion. To convert a field to a frame, each new line of pixel values is obtained from pixel values in the line immediately above the new line and in the line immediately below the new line. Each new pixel value is calculated by averaging its four nearest neighbor pixel values. Expressed mathematically, where X is the new pixel value and A, B, C, and D are the neighbor pixel values:

$$X = \frac{A+B+C+D}{4}.$$

Although only the conversion of an even field to a frame is illustrated, the same process is performed to convert each odd field to a frame.

Figure 4:
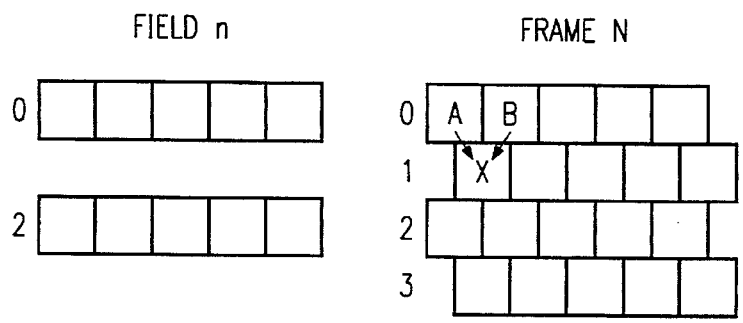
FIG. 4 illustrates a line double method of progressive scan conversion for staggered pixel data.

The method of FIG. 4 is a "line double" method of progressive scan conversion. To convert a field to a frame, each new line of pixel values is obtained from neighbor pixel values in either the line immediately above the new line or in the line immediately below the new line. Each new pixel value is calculated by averaging the values of two neighboring pixels. Expressed mathematically, the new pixel value, X, is calculated from the neighbor pixel values, A and B, as follows:

$$X = \frac{A+B}{2}.$$

Variations on the line doubling method include using either lines above or lines below the new line, or alternating between lines above and lines below. Although only conversion of an even field is illustrated, odd fields are converted in a similar manner.

To optimize picture quality, the proscan method can be made "motion adaptive", where the new pixel values are a combination of field insert pixel values, which are spatially aligned, and either line double or line average pixel values, which are temporally aligned. Variations on the motion adaptive method include using a motion threshold to select between spatially aligned and temporally aligned pixel values, or using a weighted average to combine the two types of data. For weighted averaging, when there is little motion, the new pixel values are weighted in favor of the spatially aligned values. When there is more motion, the new pixel values are weighted in favor of temporally aligned values.

Motion adaptive proscan methods call for some sort of motion detection. In general, motion detection is based on the concept that differences in spatially aligned pixel values from temporally separated fields indicate motion. The output of motion detection analysis is a motion value. This motion value is used to select between, or to combine, spatially aligned and temporally aligned pixel values. The motion value may be on a field-by-field basis or on some smaller scale, such as on a pixel-by-pixel basis.

For motion adaptive proscan, a motion value, M, varies from 0 to 1. For combining field insert and line average pixel values, M is used to calculate a weighted average as follows:

$$X = M\left[\frac{A+B+C+D}{4}\right] + (1-M)X'.$$

For combining field insert and line double pixel values, M is used to calculate a weighted average as follows:

$$X = M\left[\frac{A+B}{2}\right] + (1-M)X'.$$

A variation of the preceding technique is to calculate the first term by alternating between using pixel values above and pixel values below the new pixel. Thus, odd fields might use two pixel values above the new pixel values and even fields might use two pixel values below the new pixel value.

For the above-described motion adaptive methods, as M increases, the spatially aligned term (from field insert values) goes to zero. At the same time, the temporally aligned term (from line average or line double values) increases.

Figure 5:
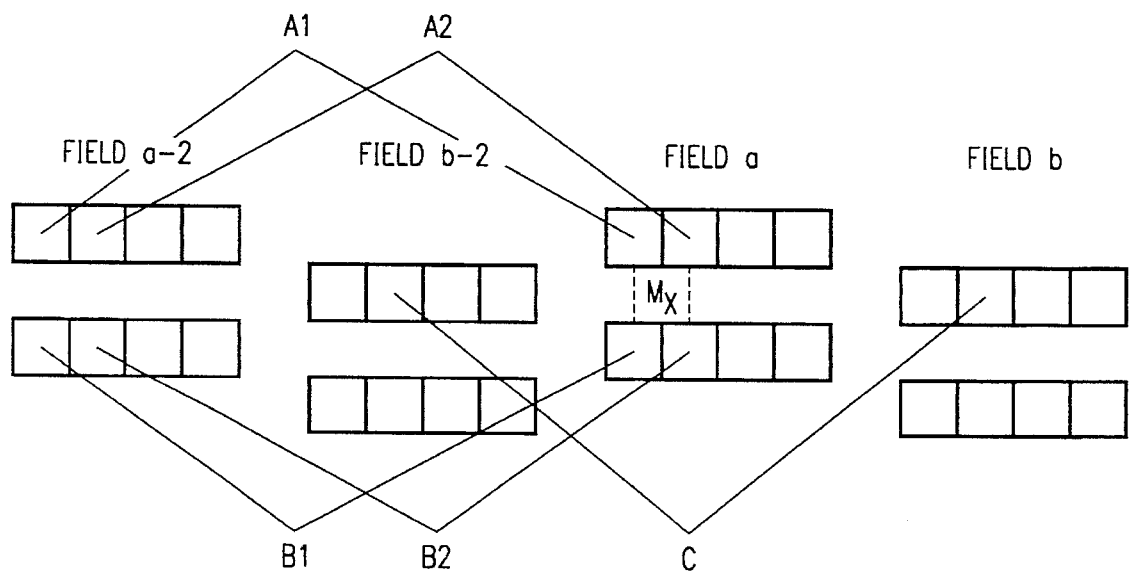
FIG. 5 illustrates how a motion detection value may be obtained for each new pixel to be generated for motion adaptive progressive scan conversion for staggered pixel data.

FIG. 5 illustrates how motion detection can be obtained on a pixel-by-pixel basis, as a prelude to proscan. The input data are fields of staggered pixel data, e.g., data that has been inverse field sampled as described above. For each new pixel to be calculated during proscan, an associated motion value is first calculated. The new pixel value, X, is in the "current" field (field a). Its motion value, $M_x$, is a combination of differences between pairs of pixel values. The pixel values are obtained from the current field (field a), a second preceding field (field a–2), and two adjacent fields (field b and field b–2).

For example, for calculating M, the pixel values from field a and from field a–2 of the pixel northwest (above and to the left) of X are subtracted to obtain the difference value, A2. Likewise, the difference values A2, B1, and B2 are obtained from other neighboring pixels in field a and field a–2. Another difference value, C, is a difference of spatially aligned pixel values, but these values are from fields b and b–2. Expressed mathematically, M is calculated as:

$$M = \frac{A1+A2+B1+B2}{8} + \frac{C}{2}.$$

This calculation of M calls for four field buffers associated with processor system 13.

Figure 6:
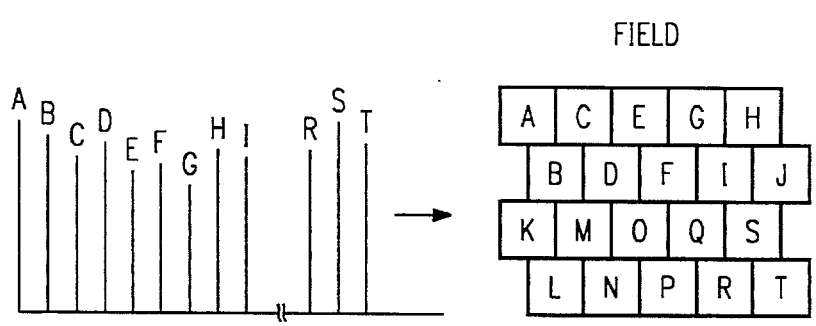
FIG. 6 illustrates a double sample method of progressive scan conversion for staggered pixel data.

FIG. 6 illustrates a "double sample" method of progressive scan conversion. In contrast to the "inverse sample" methods described above, the double sample method does not require pixel data calculations. The input signal is sampled at twice the pixel rate. The samples are illustrated as pixel values A, B, C, ... R, S, T. The pixel values are then arranged so that every other pixel value of a line of samples is one line of pixel values with the remaining values being placed on a next line. This pattern repeats for every even-odd pair of lines. As an alternative to using a doubled sample rate, the double sampling could be performed by implementing the A/D converter 12a of FIG. 1 as two A/D converters, whose clocks are each at the pixel rate but out of phase by ½ pixel period (inverted). Each field is sampled twice, with one bit stream used for odd lines of pixel values and the other bit stream for even lines of pixel values.

Vertical Scaling

Figure 7:
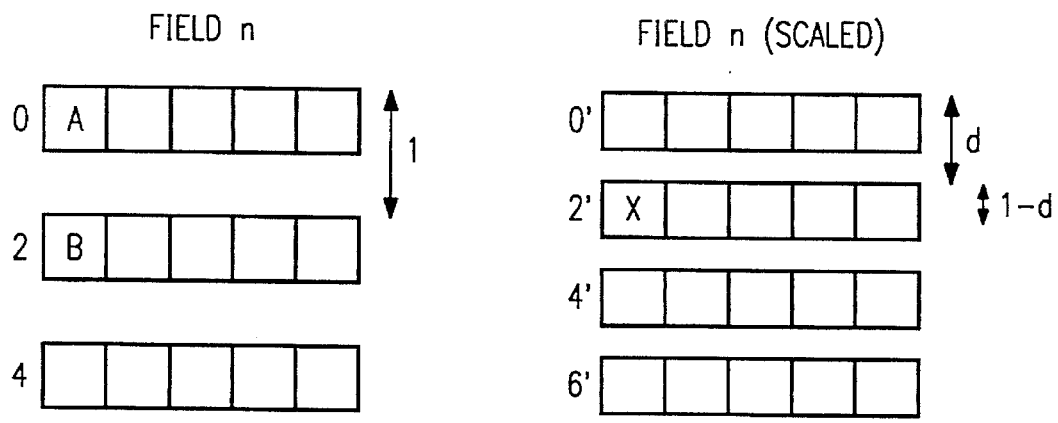
FIG. 7 illustrates a method of vertically scaling frame data.

FIG. 7 illustrates a method of using processor system 13 to perform vertical scaling on pixel data in interlaced field format. The data has been sampled for staggered pixels, which may be achieved by the methods described above, such as by field invert sampling or by double sampling. As a result of this sampling, the data is staggered pixel data. Because this data is in field format (no proscan has been performed), each field has only pixel data for every other line (even or odd).

In the example of FIG. 7, the scaling ratio is 3:4. Thus, for every three lines of the input field, there are four lines of the output field. However, the same concepts apply to scaling for other scaling ratios.

Because the output field is in field format, each new pixel value can be calculated from pixel values directly above or below the new pixel value. For example, pixel X is calculated by interpolating pixel values A and B. Subsequent proscan processing can be performed on the scaled data as described above.

The interpolation of the field format scaling is improved if the value that is closer is given greater weight. For example, in FIG. 7, the old lines are identified as lines 0,2,4 ..., and the new lines as lines 0',2',4'. . . If the distance between line 0 and line 2 is 1 and the distance between line 0' and line 2' is d, the distance between line 2' and line 2 is 1–d. The pixel value X may be calculated as follows:

$$X = dB + (1-d)A.$$

Figure 8:
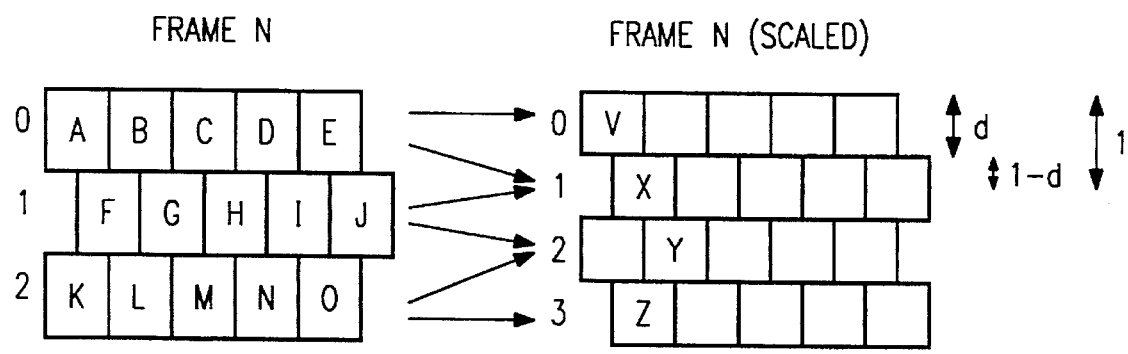
FIG. 8 illustrates a method of vertically scaling field data.

FIG. 8 illustrates a method of using processor system 13 to perform vertical scaling on pixel data in frame format. The frame format may be the result of progressive scan conversion using methods such as those described above in connection with FIGS. 2–6. Or, the data may have been received in frame format rather than in field format. In either case, the pixel values are sampled for staggered pixels.

For purposes of example in FIG. 8, the scaling ratio is 3:4, such that three input lines are used to generate four output lines. However, the same concepts apply for scaling with other scaling ratios.

For frame format scaling, the first line of the input frame (the "old" first line) is used for the first line of the scaled frame (the "new" first line). The pixel values of this first new line are the same as those of the old first line. Thus, for the first pixel, V, in line 0 of the scaled frame, V=A.

The new second line is calculated from the adjacent lines in the input frame, which are the old first line and the old second line. The old second line corresponds to the new second line in the sense that it is odd and thus has values that are spatially aligned with values of the new second line. The old first line has pixel values above and to the right or left of the new values of the new second line. The first pixel of the new second line, X, is interpolated from the spatially aligned value, F, and from the values above it, A and B. The value that is closer is given greater weight. In other words, if the distance between the old first line and the old second line is 1 and the distance between the old first line and the new first line is d, the distance between the new first line and the old second line is 1–d. The calculation of X can be expressed as:

$$X = dF + (1-d)\frac{A+B}{2}.$$

The new third line is calculated in a manner similar to calculation of the new second line, using interpolated values from adjacent lines of the input frame. For example, the second pixel of the third new line, Y, is interpolated from the spatially aligned value, L, and from the values above it, F and G.

The new last (fourth) line is calculated from values of the old last (third) line. However, these lines do not correspond because one is even and one is odd. As a result, the pixel values of the old third line must be horizontally interpolated to accommodate this change from even to odd. The pixel value Z is the average of pixel values K and L. For other scaling ratios, this horizontal interpolation will be required when there is an even number of lines between the first and last new lines. As an alternative to the horizontal interpolation, the data for that line could be sampled at twice the pixel rate so that odd-line pixel values are available.

Other Embodiments

Although the invention has been described with reference to specific embodiments, this description is not meant to be construed in a limiting sense. Various modifications of the disclosed embodiments, as well as alternative embodiments, will be apparent to persons skilled in the art. It is, therefore, contemplated that the appended claims will cover all modifications that fall within the true scope of the invention.

What is claimed is:

1. A method of converting an analog input signal in interlaced field format to vertically scaled pixel data in frame format for display on a spatial light modulator (SLM) having staggered pixels, comprising the steps of:

sampling said input signal so as to provide pixel values in staggered pixel format;

interpolating said pixel values of each field to provide new lines in accordance with a scaling ratio; and for each field of said sampled pixel values, providing a new line of new pixel values to be displayed between every existing line of said sampled pixel values.

2. The method of claim 1, wherein said providing step is performed by copying existing pixel values from an adjacent field.

3. The method of claim 1, wherein said providing step is performed by calculating new pixel values.

4. The method of claim 3, wherein said new pixel values are calculated by averaging pixel values on a line above or below said new line.

5. The method of claim 3, wherein said new pixel values are calculated by averaging nearest neighbor pixel values of each new pixel.

6. The method of claim 1, wherein said providing step includes the substep of detecting motion between said fields.

7. The method of claim 6, wherein said substep of detecting motion is performed by determining a motion value for each new pixel to be calculated.

8. A method of vertically scaling pixel data in frame format for display on a spatial light modulator (SLM) having staggered pixels, comprising the steps of:

using a first line of an input frame of pixel values as a first line of the scaled frame of pixel values;

calculating a second line of said scaled frame by interpolating values of adjacent lines of said input frame, said adjacent lines being said first line of said input frame and a second line of said input frame;

repeating said calculating step for each next line of said scaled frame, wherein the interpolated values are from lines of said input frame adjacent to said each next line;

if an even number of lines are between said first line and the last line of said scaled frame, horizontally interpolating values of the last line of said input frame to calculate values of said last line of said scaled frame; and if an odd number of lines are between said first line and the last line of said scaled frame, using said last line of said input frame as the last line of said scaled frame.

9. The method of claim 8, wherein said calculating step is performed by calculating each new pixel value by interpolating a pixel value that is spatially aligned with said new pixel value and neighboring pixel values on one of said adjacent lines.

10. The method of claim 9, wherein said interpolating is weighted in favor of pixel values closest to said new pixel value.

* * * * *